US010858025B2

(12) United States Patent
Eisele

(10) Patent No.: US 10,858,025 B2
(45) Date of Patent: *Dec. 8, 2020

(54) SEAT CUSHION

(71) Applicant: Kathleen Anne Eisele, Oregon City, OR (US)

(72) Inventor: Kathleen Anne Eisele, Oregon City, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/684,934

(22) Filed: Nov. 15, 2019

(65) Prior Publication Data

US 2020/0079410 A1 Mar. 12, 2020

Related U.S. Application Data

(63) Continuation of application No. 16/043,605, filed on Jul. 24, 2018, now Pat. No. 10,518,795.

(51) Int. Cl.
*B62B 3/14* (2006.01)

(52) U.S. Cl.
CPC .................. *B62B 3/1448* (2013.01)

(58) Field of Classification Search
CPC ......... B62B 3/1448; B62B 3/144; B60N 2/28; B60N 2/2881

USPC ....................... 297/219.12, 219.11
See application file for complete search history.

(56) References Cited

U.S. PATENT DOCUMENTS

| | | | |
|---|---|---|---|
| 4,324,430 A | 4/1982 | Dimas, Jr. et al. |
| 4,416,462 A | 11/1983 | Thompson |
| 5,330,250 A | 7/1994 | Reyes |
| 5,855,412 A | 1/1999 | Smith et al. |
| 6,164,721 A | 12/2000 | Latshaw et al. |
| 6,224,152 B1 | 5/2001 | Hughes et al. |
| 6,582,017 B1 | 6/2003 | Barnes et al. |
| 2003/0205922 A1 | 11/2003 | Norman |
| 2011/0012404 A1 | 1/2011 | Cariera |
| 2018/0312186 A1 | 11/2018 | Lopez |

*Primary Examiner* — Mark R Wendell
(74) *Attorney, Agent, or Firm* — Perkins Coie LLP

(57) ABSTRACT

Introduced here is a lightweight, foldable seat cushion which can be placed in the shopping cart seat to support a child's legs, and prevent the hard surfaces of the shopping card, such as bars, from causing discomfort to the child and causing the child to try to get out of the cart. The seat cushion can attach to the cart using an attachment mechanism such as magnets and/or clasping protrusions, thus preventing the movement of the seat within the cart. The seat cushion can fold for easy storage in a diaper bag. The lightweight, and the compact size of the seat cushion makes the carrying of the seat cushion convenient and effortless.

15 Claims, 19 Drawing Sheets

SEAT CUSHION

CROSS-REFERENCE TO RELATED APPLICATIONS

This application is a continuation of U.S. patent application Ser. No. 16/043,605 filed Jul. 24, 2018, now U.S. Pat. No. 10,518,795, issued Dec. 31, 2019, which is incorporated herein by this reference in its entirety.

TECHNICAL FIELD

The present application is related to a seat cushion, and more specifically to methods and systems that enable safe and comfortable seating of a child in a shopping cart.

BACKGROUND

Caregivers can place children of various ages from 1-year-old to a pre-schooler, in a seat of a shopping cart while browsing in a store. The children can get uncomfortable, fidgety, try to sit sideways in the seat, and can even stand up in the attempt to climb out of the shopping cart seat. The shopping cart can move, and the child can fall over. An infant can fall from the cart and go head first to the pavement.

SUMMARY

Introduced here is a lightweight, foldable seat cushion which can be placed in the shopping cart seat to support a child's legs, and prevent the hard surfaces of the shopping card, such as bars, from causing discomfort to the child and causing the child to try to get out of the cart. The seat cushion can attach to the cart using an attachment mechanism such as magnets and/or clasping protrusions, thus preventing the movement of the seat within the cart. The seat cushion can fold for easy storage in a diaper bag. The lightweight, and the compact size of the seat cushion makes the carrying of the seat cushion convenient and effortless.

DETAILED DESCRIPTION

Seat Cushion

Introduced here is a lightweight, foldable seat cushion which can be placed in the shopping cart seat to support a child's legs, and prevent the hard surfaces of the shopping card, such as bars, from causing discomfort to the child and causing the child to try to get out of the cart. The seat cushion can attach to the cart using an attachment mechanism such as magnets and/or clasping protrusions, thus preventing the movement of the seat within the cart. The seat cushion can fold for easy storage in a diaper bag. The lightweight, and the compact size of the seat cushion makes the carrying of the seat cushion convenient and effortless.

Figure 1:
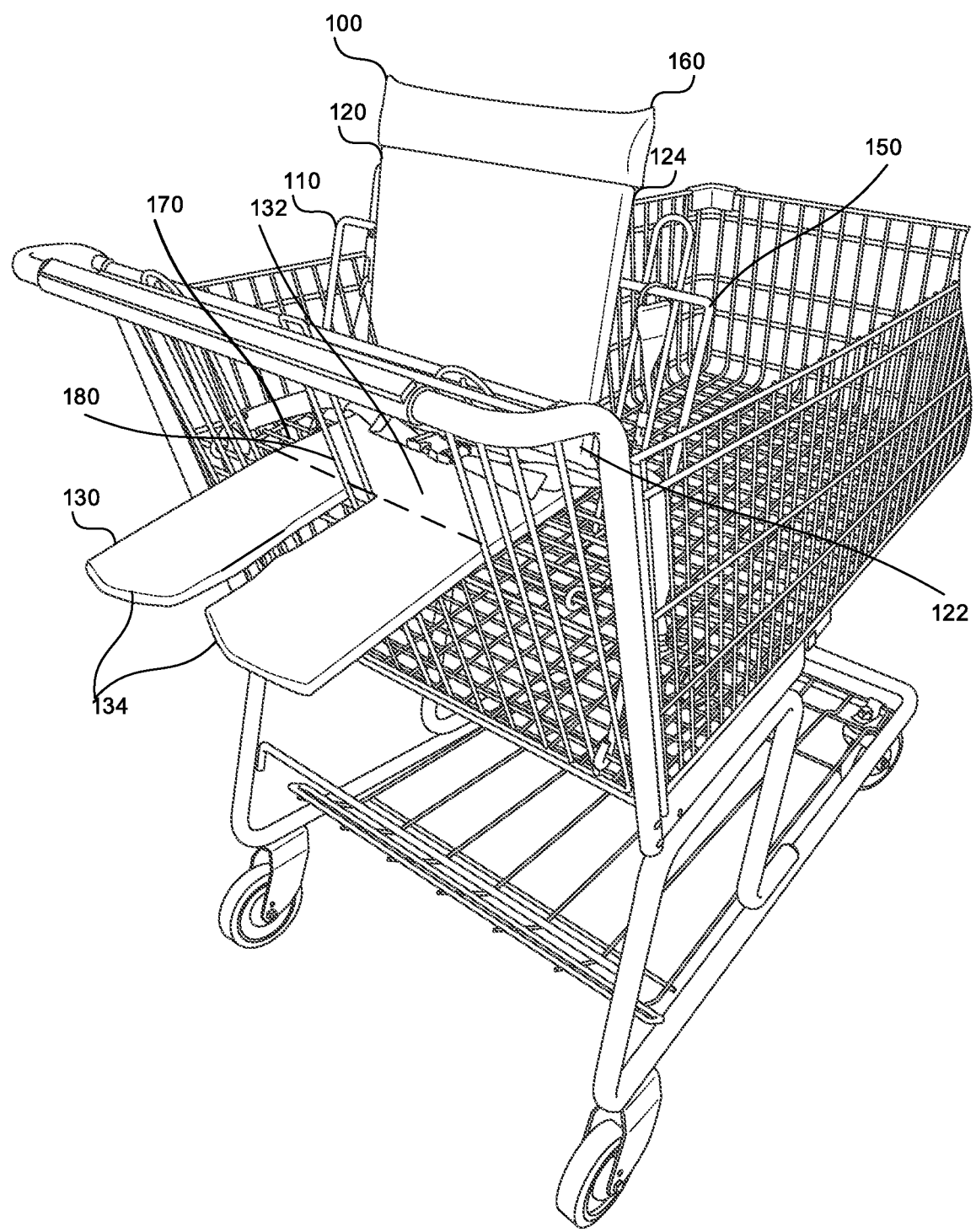
FIG. 1 shows a seat cushion placed upon and readily separable from a shopping cart.
Figure 2:
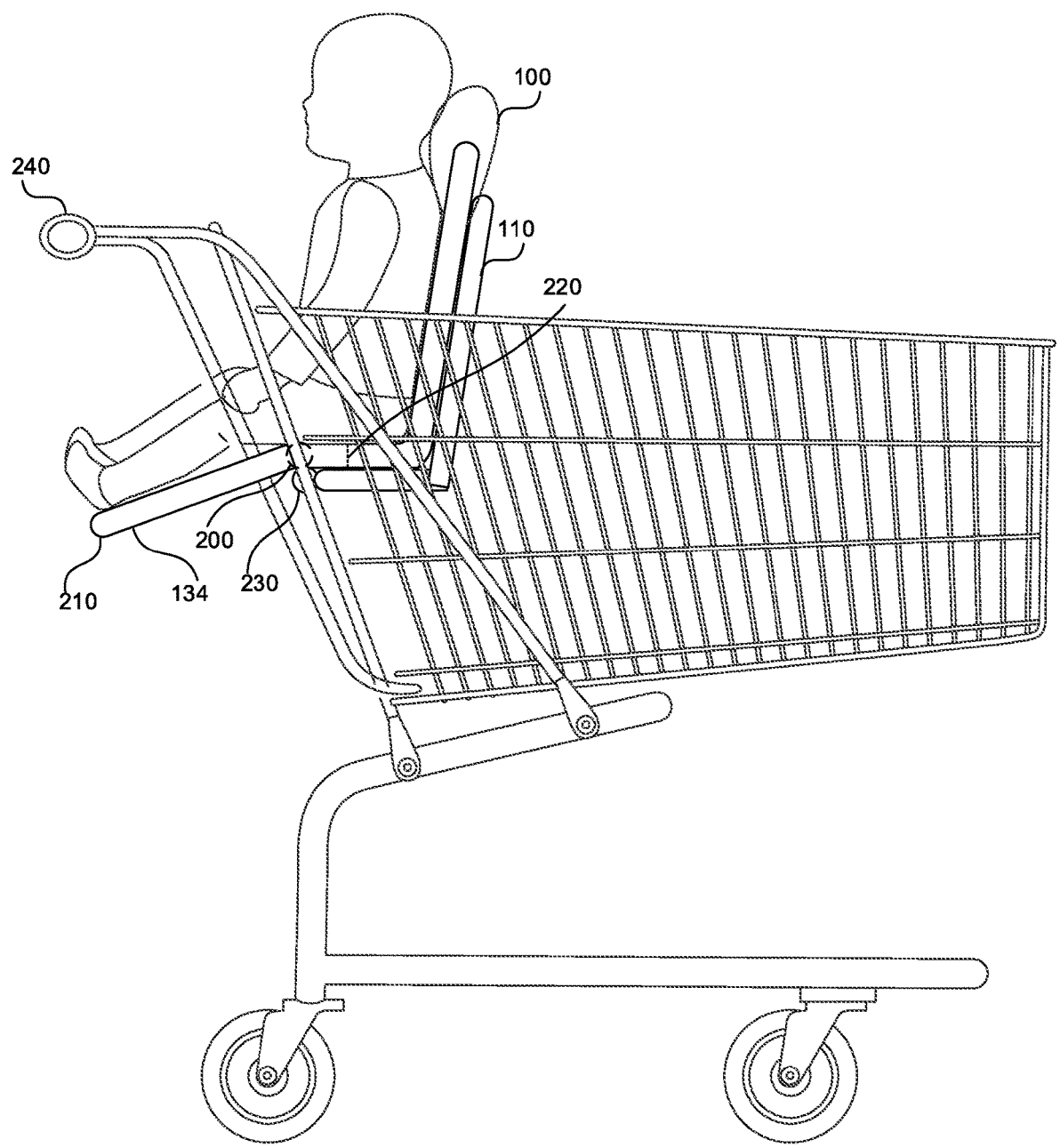
FIG. 2 shows a child seated within the seat cushion.

FIG. 1 shows a seat cushion placed upon and readily separable from a shopping cart. The seat cushion 100 provides a comfortable seat for a child sitting in the shopping cart seat 110, as shown in FIGS. 2, 4, by providing a safe and soft environment reducing the likelihood that the child will attempt to get out of the cart. The seat cushion 100 can include a backrest 120, a seat 130, and an attachment mechanism (not shown) to secure the seat cushion 100 to the shopping cart seat 110. The seat cushion 100 can be made of lightweight materials so that the total weight of the seat cushion does not exceed two pounds.

The backrest 120 can lean against a first support member, i.e., the backrest 150, of the shopping cart seat 110. The backrest can have a proximal end 122 and a distal end 124, where the distal end 124 includes a headrest 160. The headrest 160 can have an enlarged thickness, larger than the thickness of the backrest 120. Both the backrest 120 and the headrest 160 can include a cushioning layer such as high-density foam, gel cushion, ethyl vinyl acetate, etc.

The seat 130 can lean against a second support member, i.e., the seat 170, of the shopping cart. The seats 130 can include a back portion 132 hingedly joined to the proximal end 122 of the backrest 120 and a front portion formed into two prongs 134 defining a gap surrounding a leg separator 180 of the shopping cart seat 110. The two prongs 134 can support legs of a user, such as a child, as shown in FIGS. 2, 4 when the child is seated in the seat cushion 100. The two prongs 134 can support the legs of a child in substantially horizontal position, i.e., +/−10° away from the horizontal, or the two prongs 134 can bend when supporting the legs of the user.

The attachment mechanism can be attached to the backrest 120 and/or the seat 130 coupled to the backrest. The attachment mechanism can secure the seat cushion 100 to the shopping cart seat 110.

FIG. 2 shows a child seated within the seat cushion 100. When the child is seated within the seat cushion 100, the two prongs 134 of the seat can bend between 0 and 90° from horizontal. FIG. 2 shows the two prongs 134 bending approximately 30° from horizontal at a pivot 200. The pivot 200 is the point at which the seat cushion 100 touches the shopping cart seat 110. Using the action of the lever, the strongest force on the two prongs 134 is at the distal end 210 of the prongs 134. Consequently, the distal end 210 of the prongs 134 bends the farthest around the pivot 200. The thickness 220 of the seat cushion 100 protects the child's legs from the hard bars 230 of the shopping cart seat 110. As can be seen in FIG. 2, in one embodiment, the seat cushion 100 does not extend past the handlebar 240 of the shopping cart seat 110. That way, the seat cushion 100 does not interfere with the person pushing the cart. In another embodiment, the seat cushion 100 can extend up to 2 inches past the handlebar 240 of the shopping cart seat 110 to minimize the interference with the person pushing the cart.

Figure 3A:
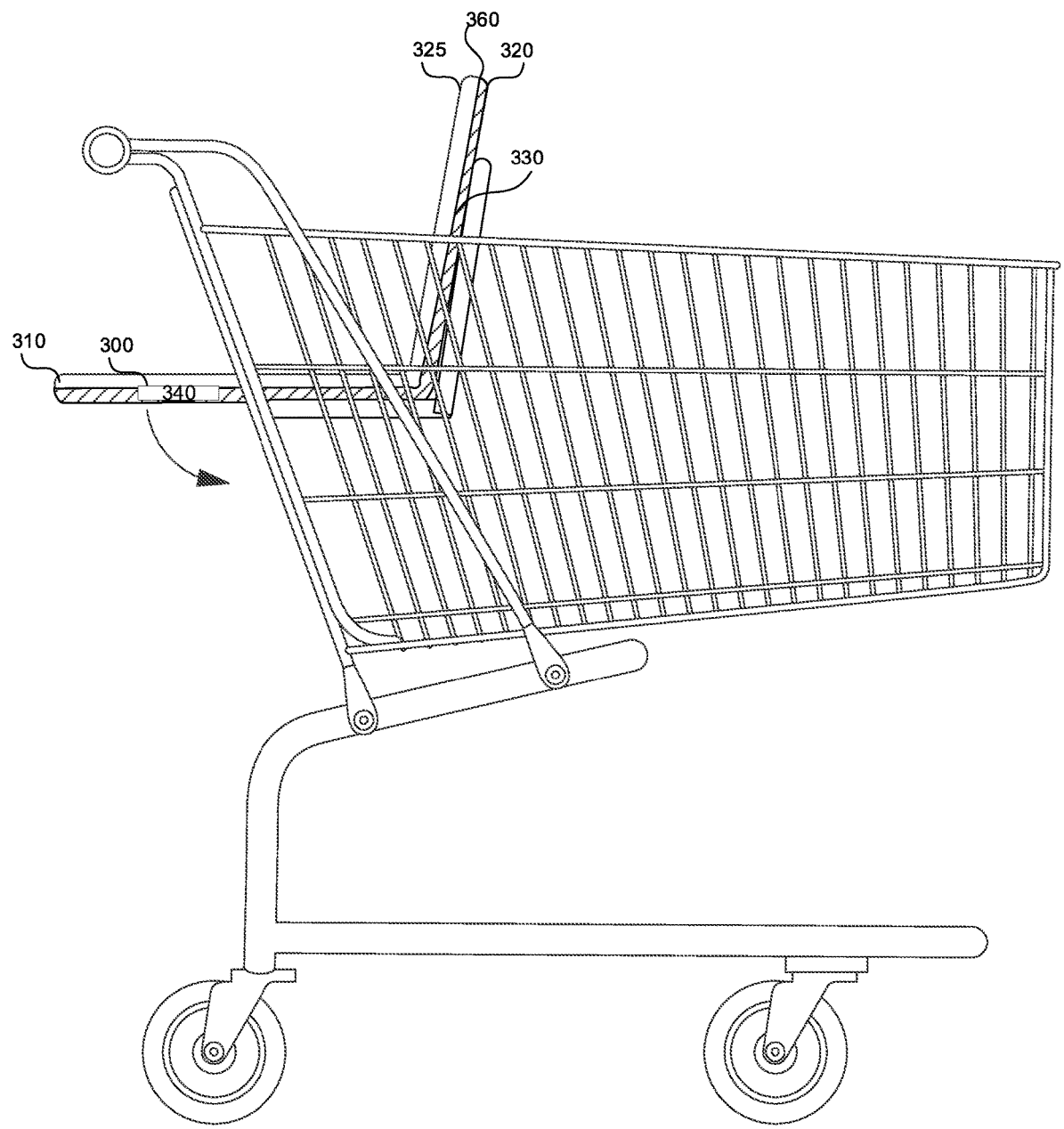
FIG. 3A-3B shows the two prongs of the bottom layer of the seat cushion having a medial region different from the remainder of the two prongs.
Figure 3B:
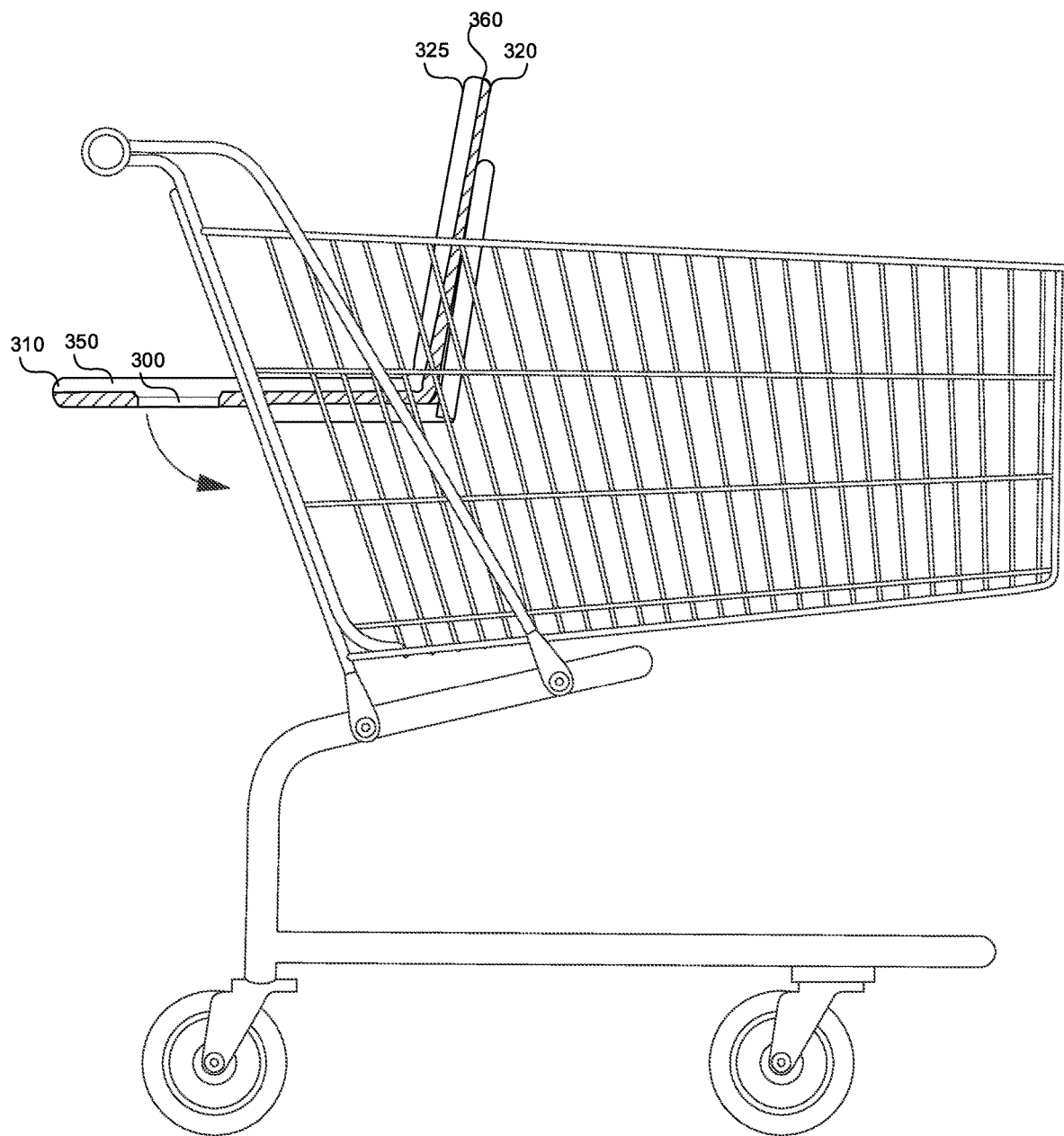

FIG. 3A-3B shows the two prongs of the bottom layer of the seat cushion having a medial region different from the remainder of the two prongs. The seat cushion 360 can include a bottom layer 320 which is made from a different material than the top layer 325. In one embodiment, the two prongs 310 of the bottom layer 320 of the seat cushion 360 can be made of single material as shown in FIG. 2. The single material can be a firm layer that can bend slightly under the weight of the child's legs as explained in this application.

In FIG. 3A, the medial region 300 of the two prongs 310 of the bottom layer 320 can be made of a second material 340, while the rest of the two prongs 310 are made of the first material 330. The first material 330 can be firmer than the second material 340. The first material 330 can be a polyethylene structural foam, polyurethane structural foam, an ethyl vinyl acetate, etc. The second material 340 can be a softer material such as low-density polyethylene structural foam, low-density polyurethane structural foam, low density ethyl vinyl acetate, cushion high density foam, ethyl vinyl acetate, or a gel cushion, etc.

In FIG. 3B, the medial region 300 of the two prongs 310 of the bottom layer 320 can be thinner than the rest of the bottom layer 320. As a result, the medial region 300 can be softer than the rest of the bottom layer 320, and can bend under the weight of the child's legs. The material contained in the medial region 300 can be the same as the material contained in the rest of the bottom layer 320. The gap 350 formed by the medial region 300 can be filled in with a cushioning layer as described in this application.

Figure 3C:
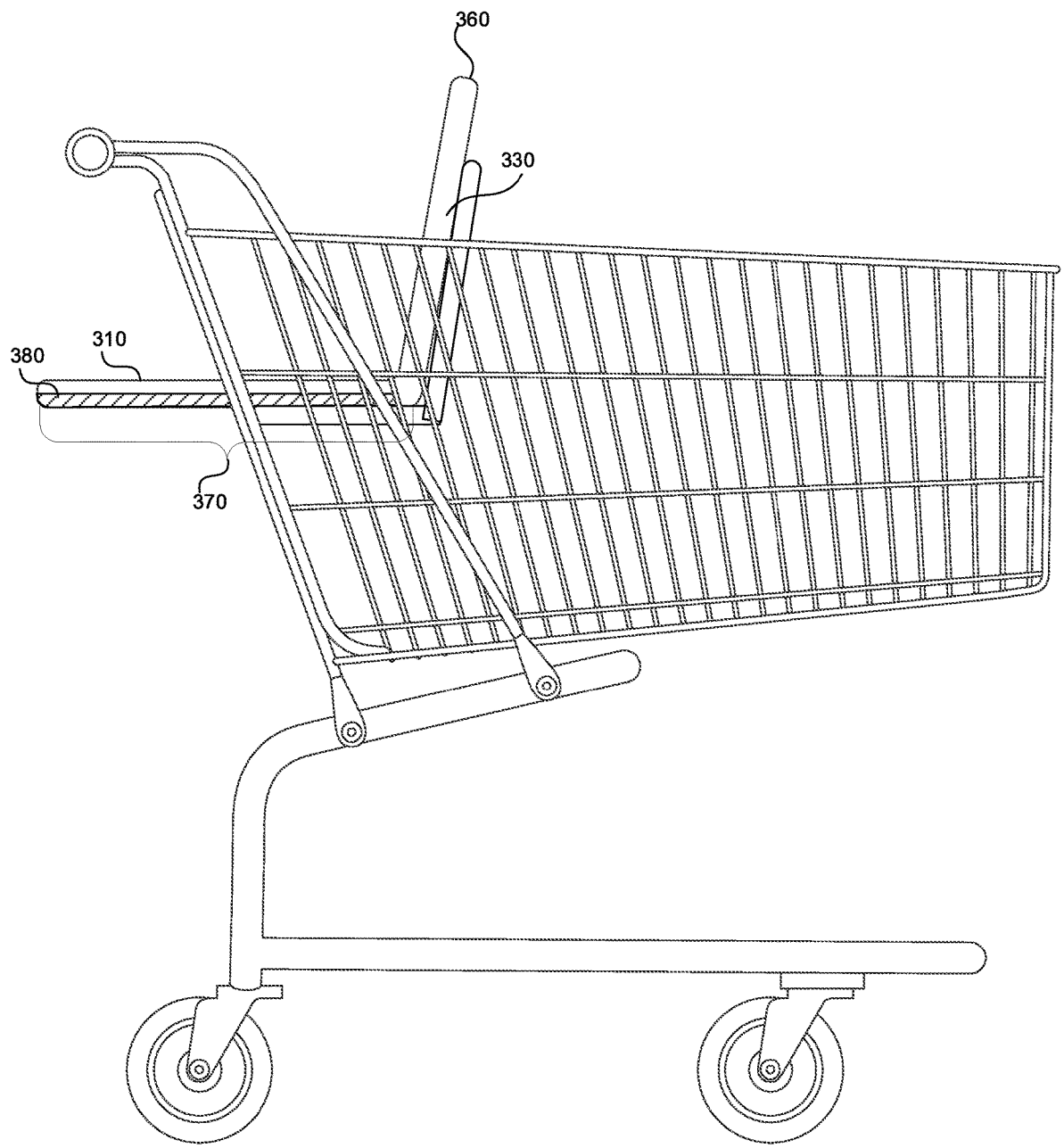
FIG. 3C shows the bottom layer of the seat cushion confined to the seat of the seat cushion.

FIG. 3C shows the bottom layer 380 of the seat cushion 360 confined to the seat 370 of the seat cushion 360. The seat 370 can include the two prongs 310. The bottom layer 380 can be made out of polyethylene structural foam, polyurethane structural foam, an ethyl vinyl acetate, high density polyethylene (HDPE), etc. The bottom layer 380 can be modified as explained in FIG. 3A-3B with a thinner medial region, or a medial region made out of a softer material. The bottom layer can have a thickness of ⅛ of an inch.

Figure 4A:
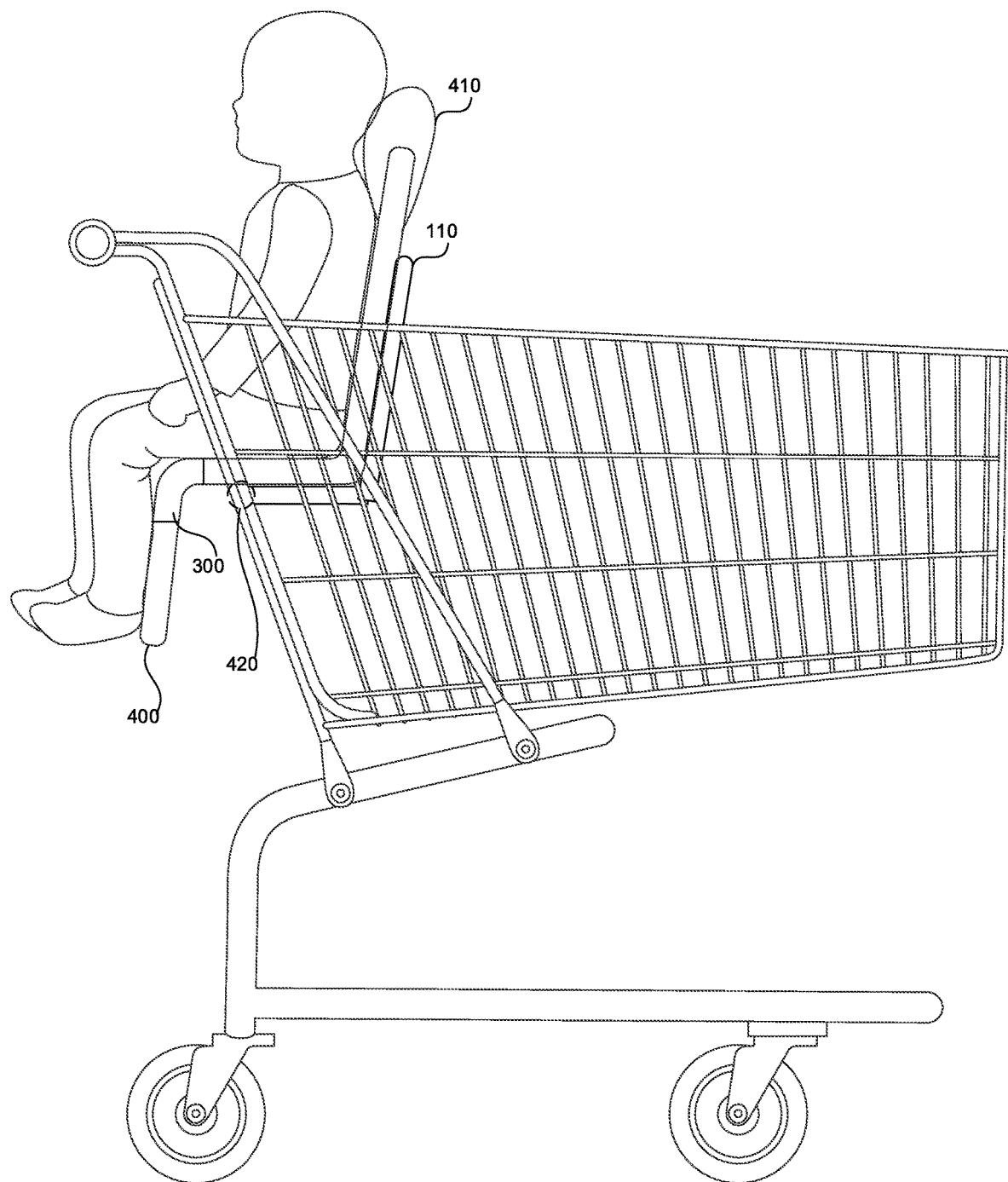
FIG. 4A shows a child seated in the seat cushion having the medial region.

FIG. 4A shows a child seated in the seat cushion having the medial region 300. The medial region 300 approximately corresponds to the position of the child's knees, and allows the medial region 300 to bend under the weight of the child's legs. As a result, the child's knees can bend up to 120° away from the horizontal, and the child's legs do not interfere with the person pushing the cart. In FIG. 4 the pivot around which the two prongs 400 bend is the medial region 300, as opposed to the pivot 420, where the seat cushion 410 meets the shopping cart seat 110. As a result, the stress on the seat cushion 410 is smaller at the pivot 420, thus reducing the likelihood of the seat cushion 410 breaking or tearing at the pivot 420.

Figure 4B:
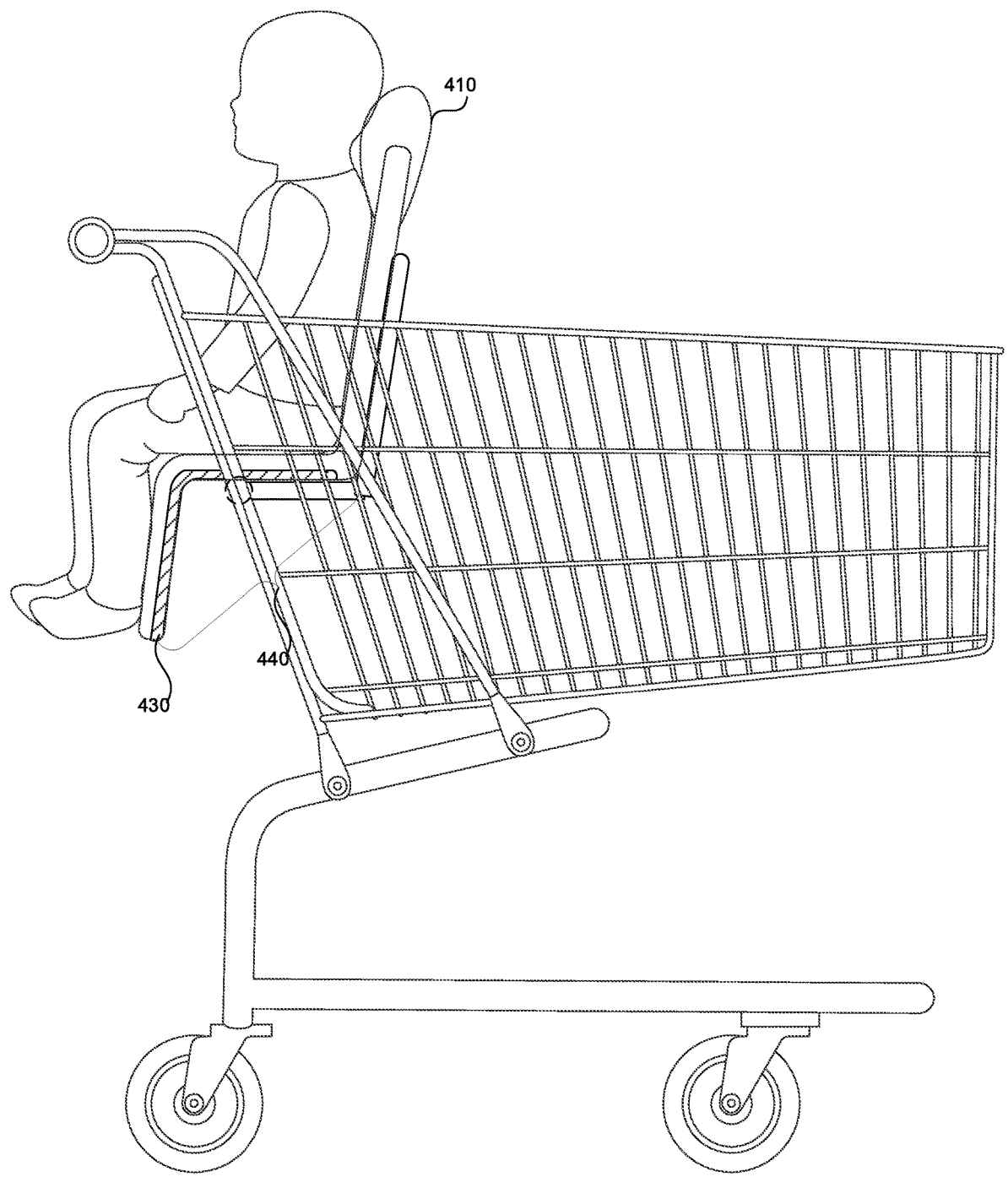
FIG. 4B shows a child seated in the seat cushion having a bottom layer confined to the seat of the seat cushion.

FIG. 4B shows a child seated in the seat cushion 410 having a bottom layer 430 confined to the seat 440 of the seat cushion 410. The bottom layer 430 can be firm, but bendable under the weight of the child's legs. The bottom layer 430 can bend between 0° and 120° away from horizontal position shown in FIG. 3C. The bottom layer 430 can be made out of HDPE, polyethylene structural form, polyurethane structural form, ethyl vinyl acetate, etc.

Figure 5A:
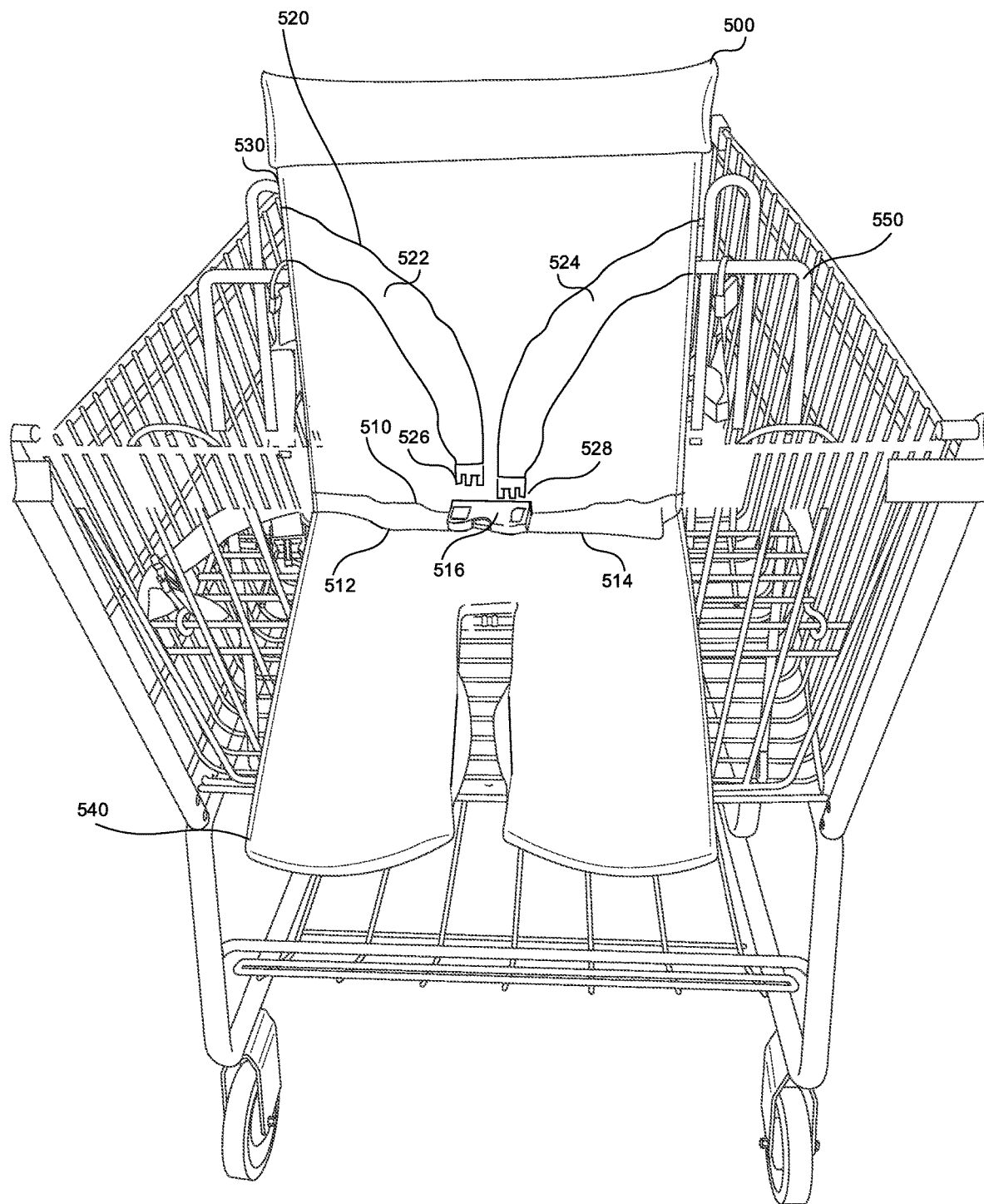
FIG. 5A shows various straps that can be part of the seat cushion.

FIG. 5A shows various straps that can be part of the seat cushion. The seat cushion 500 can include one or more straps 510, 520. Strap 510 can include a buckle 516 that connects the two bands 512, 514 to each other. Strap 510 can be secured to the juncture of the backrest 530 in the seat 540, or can be secured to the backrest 530, or the seat 540 in proximity to the juncture.

Strap 510 can serve multiple functions. Strap 510, or strap 520, can secure a child sitting in the seat cushion 500. Also, strap 510 can detachably secure the seat cushion 500 to the backrest 550 of the shopping cart, by strapping around the backrest 550. Strap 510 can also detachably secure the backrest 530 to the seat 540 when the seat cushion 500 is folded. Securing the backrest 530 the seat 540 ensures that the folded seat cushion 500 is compact and easy to carry.

Strap 520 can be used in addition to or instead of strap 510. Strap 520 can be attached to the backrest 530 (front side 532, or backside) and can be used as a shoulder strap to further secure the child sitting in the seat cushion 500. Strap 520 can include two bands 522, 524 and buckle 526, 528, which can connect to the buckle 516 of the strap 510. Similar to strap 510, strap 520 can secure the seat cushion 500 to the backrest 550 of the shopping cart by strapping around the backrest 550. Strap 520 can also secure the backrest 532 the seat 540 when the seat cushion 500 is folded.

Figure 5B:
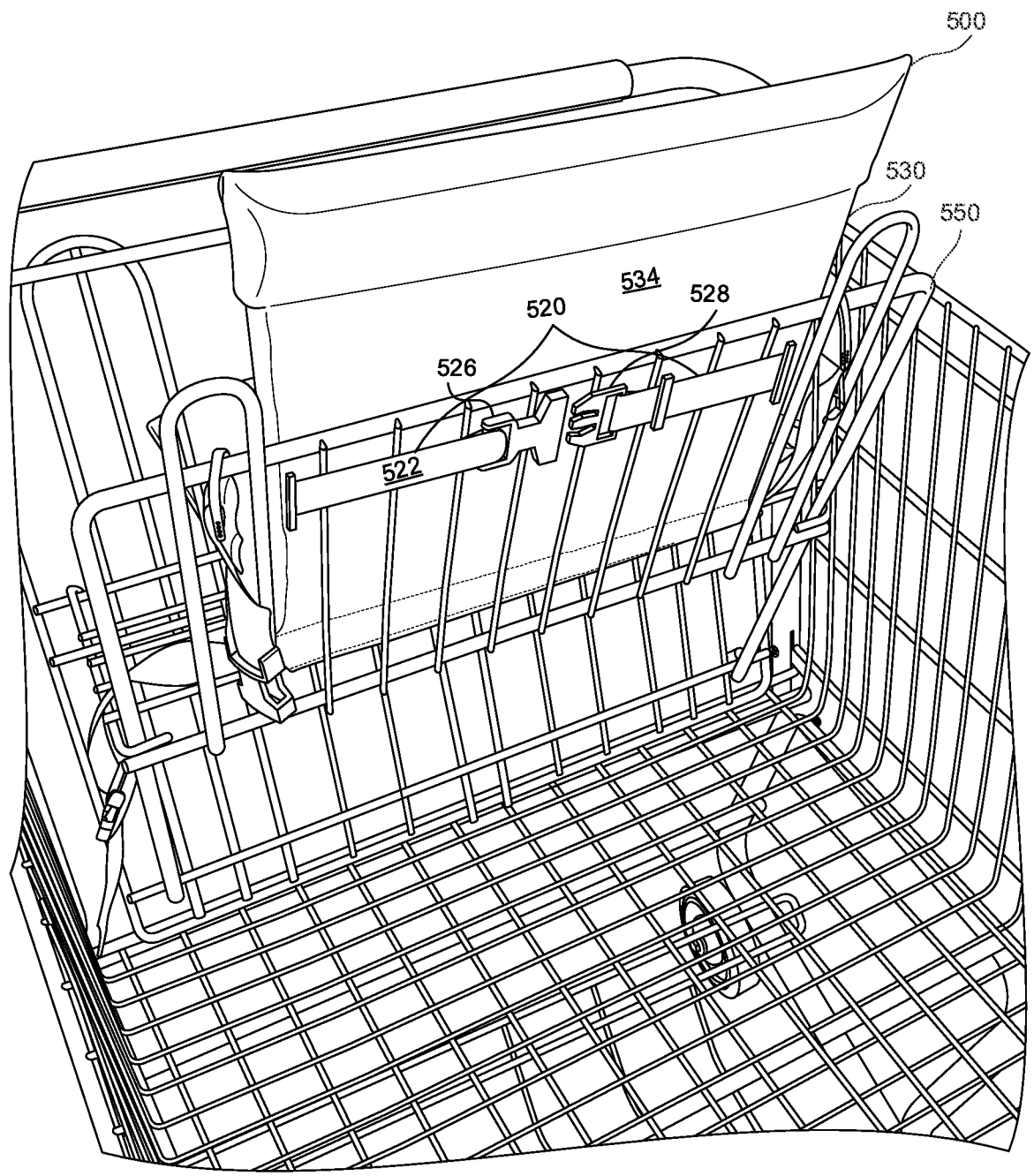
FIG. 5B shows a strap as an attachment mechanism between the seat cushion and the shopping cart.

FIG. 5B shows a strap as an attachment mechanism between the seat cushion and the shopping cart. Strap 520, including the two bands 522, 524, can wrap around the backrest 550 of the shopping cart. Securing the buckles 526, 528 to each other, strap 520 can attach the seat cushion 500 to the backrest 550 of the shopping cart. The bands 522, 524 can be secured to the backside 534 of the backrest 530 as shown in FIG. 5B, or the bands 522, 524 can be secured to the front side 532 in FIG. 5A.

Figure 6:
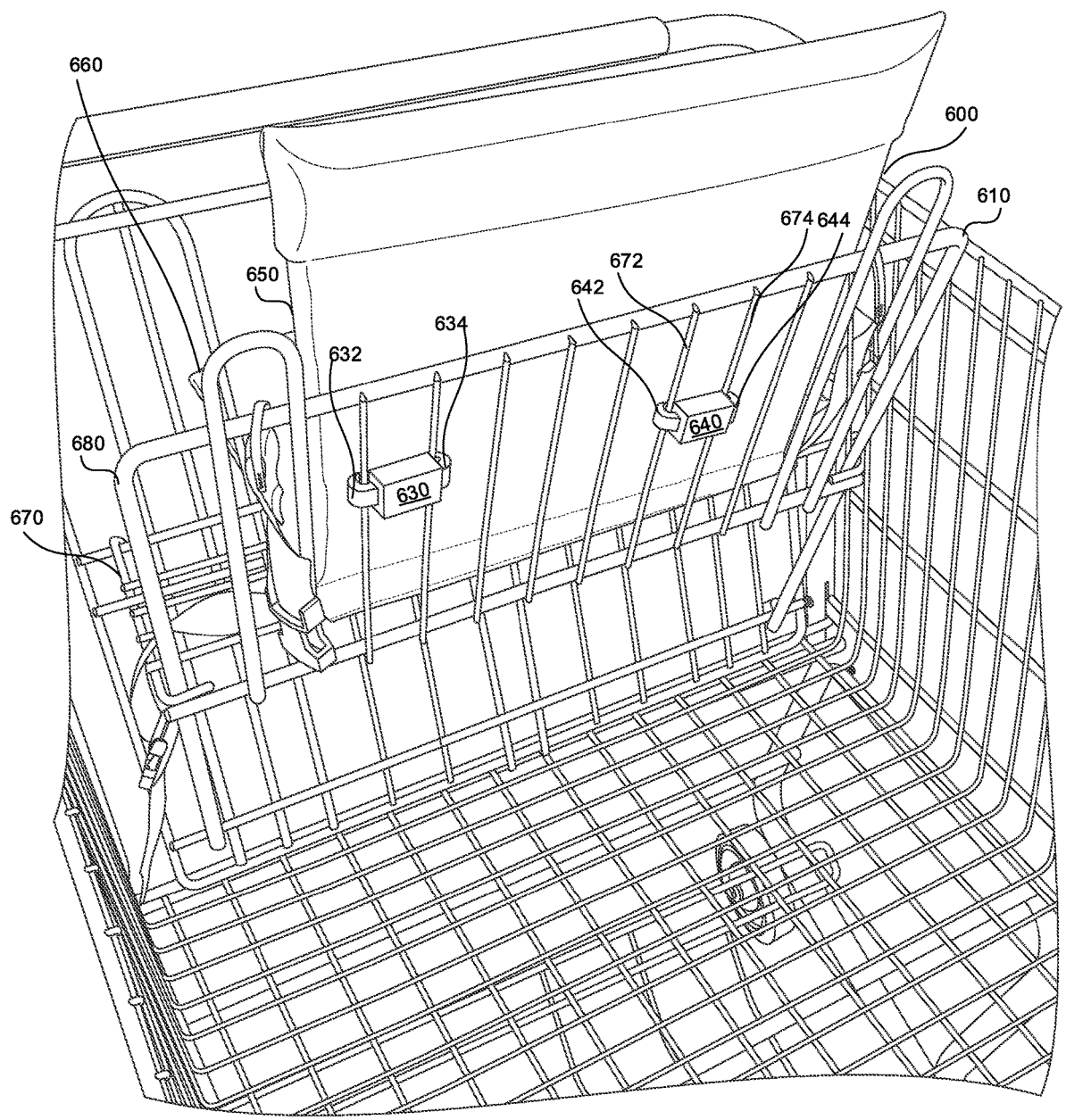
FIG. 6 shows an attachment mechanism between the seat cushion and the shopping cart.

FIG. 6 shows an attachment mechanism between the seat cushion and the shopping cart. The attachment mechanism can include one or more protrusions 630, 640 which can attach the seat and cushion 600 to the shopping cart seat 610. The protrusion 630, 640 can be attached to the backrest 650 of the seat cushion 600, and/or attached to the seat 660 of the seat cushion 600. For example, one of the protrusions can be attached to the backrest 650, while the other protrusion is attached to the seat 660.

The protrusions 630, 640 have a width that can fit between bars 672, 674 (only two labeled for brevity) of the backrest 680 of the shopping cart seat 610 and/or the seat 670 of the shopping cart seat 610. The protrusion 630, 640 can include two or more directional protrusions 632, 634, 642, 644. The directional protrusion 632, 634, 642, 644 can retract when the backrest 650 is pushed against the backrest 680 of the shopping cart seat 610. Once the directional protrusions 632, 634, 642, 644 have passed between the bars 672, 674 of the shopping cart seat 610, the directional protrusions 632, 634, 642, 644 can extend from the retracted position, and can lock to the bars 672, 674 of the backrest 680 of the shopping cart seat 610. When the directional protrusions 632, 634, 642, 644 are locked, the directional protrusions 632, 634, 642, 644 can resist separating the backrest 650 from the backrest 680 of the shopping cart seat 610.

Locking the seat cushion 600 to the shopping cart seat 610 is easy because the protrusion 630, 640 fits in the large gaps between bars 672, 674 of the shopping cart seat 610. As a result, a person can lock the seat cushion 600 onto the shopping cart seat 610 by placing the seat cushion 600 onto the shopping cart seat 610 and slightly pressing and moving the seat cushion 600 left or right until the protrusion 630, 640 passes through the bars 672, 674 and the directional protrusion 632, 634, 642, 644 locks on to the bars 672, 674.

Figure 7:
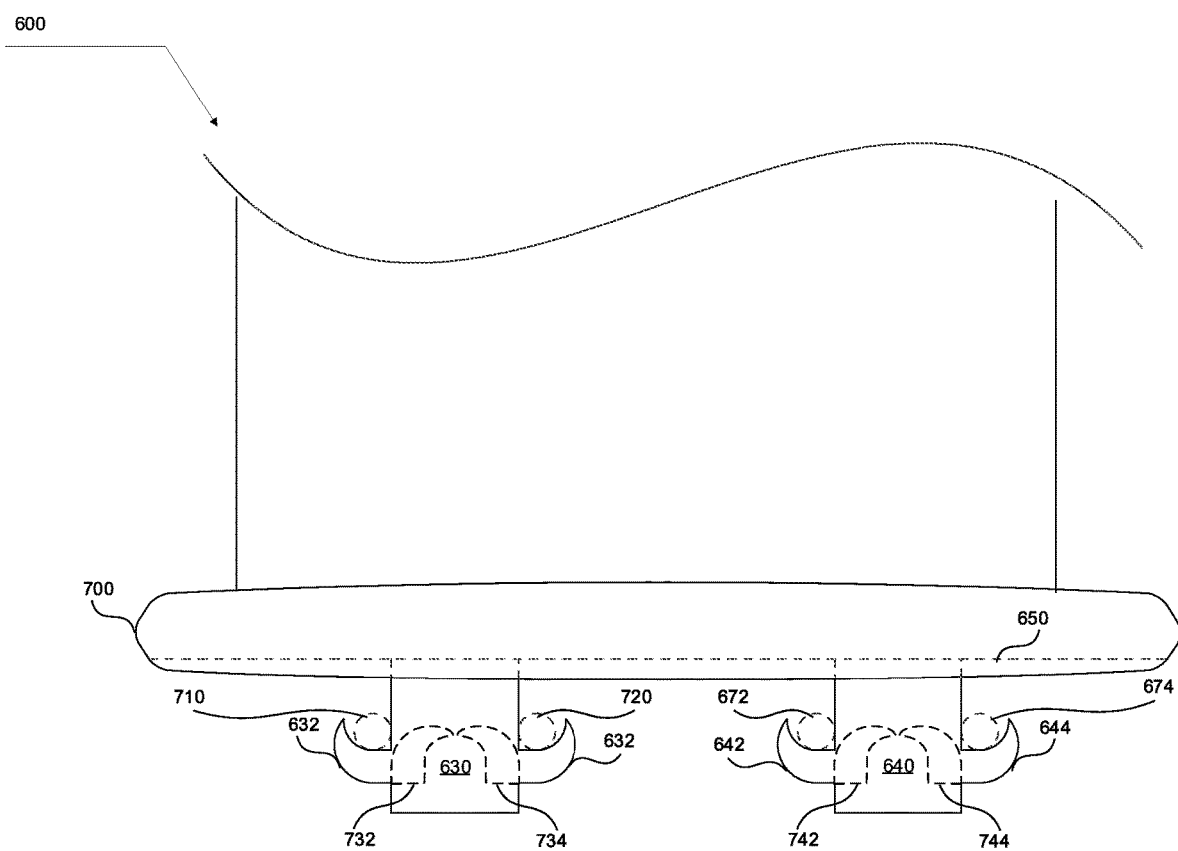
FIG. 7 is a top view of the attachment mechanism in FIG. 6.

FIG. 7 is a top view of the attachment mechanism in FIG. 6. The protrusion 630, 640 can be attached to the backrest 650 of the seat cushion 600, beneath the headrest 700. The protrusion 630, 640 can include directional protrusions 632, 634, 642, 644 which can lock onto the bars 672, 674, 710, 720. The width of the protrusion 630, 640 is slightly smaller than the distance between the bars 672, 674, 710, 720 and can be between quarter of an inch to two inches, depending on the distance between the bars 672, 674, 710, 720.

The directional protrusion 632, 634, 642, 644 can be rectangular, rectangular with rounded corners, or can be shaped like a hook, as shown in FIG. 7. The inner surface of the hook can curve toward the bars 672, 674, 710, 720 when the directional protrusion 632, 634, 642, 644 is in the locked position. The outer surface of the hook can curve away from the bars 672, 674, 710, 720 when the seat cushion 600 is not attached to the shopping cart and the directional protrusion 632, 634, 642, 644 is being pushed against the bars 672, 674, 710, 720. The curvature of the directional protrusion 632, 634, 642, 644 helps the directional protrusion 632, 634, 642, 644 to retract inside the protrusion 630, 640 and assume positions 732, 734, 742, 744, respectively.

Figure 8:
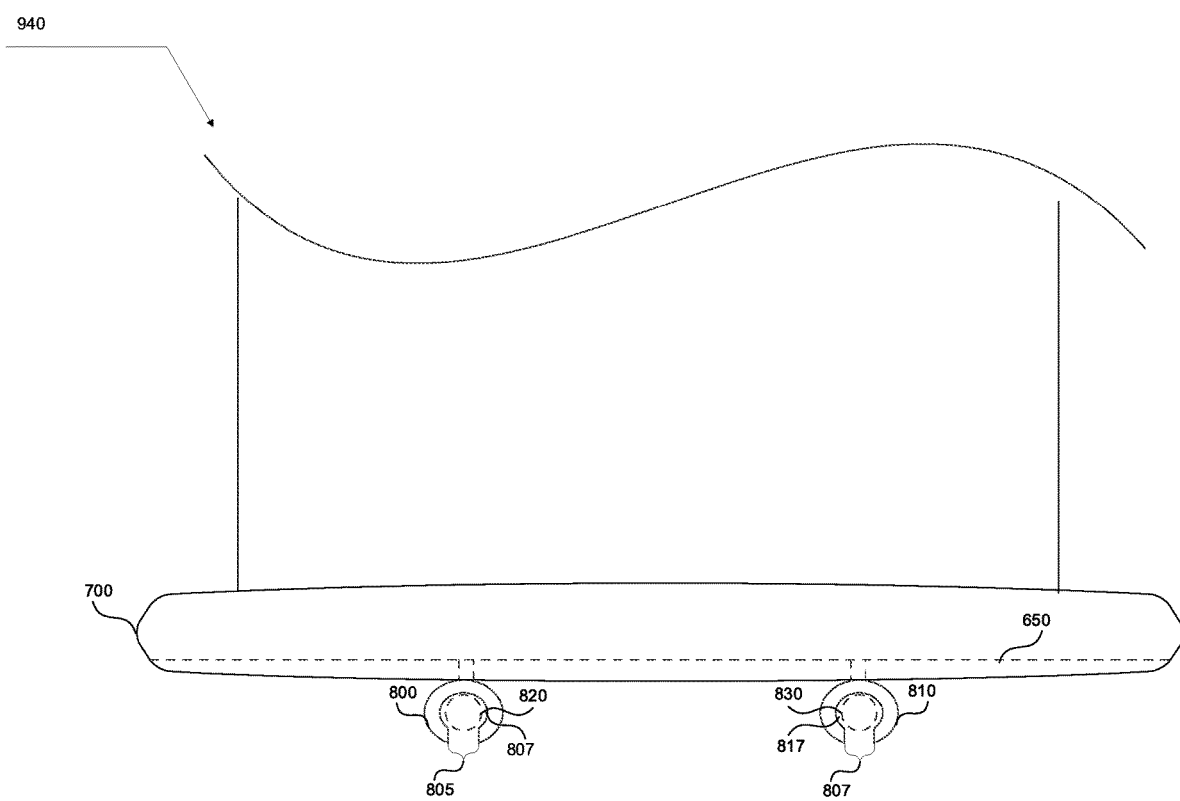
FIG. 8 is a top view of an attachment mechanism, according to another embodiment.

FIG. 8 is a top view of an attachment mechanism, according to another embodiment. The attachment mechanism can include one or more hooks 800, 810 having a hollow rounded middle 807, 817 corresponding to the size of a shopping cart bar 820, 830. The hook 800, 810 can have an opening 805, 815 at one end through which the shopping cart bar 820, 830 can be pushed. The opening 805, 815 can expand when the shopping cart bar 820, 830 pushes through the opening 805, 815. When the shopping cart bar 820, 830 is inserted into the hollow rounded middle 807, 817 of the hooks 800, 810, the hook 800, 810 goes back to its rest position, and clamps onto the shopping cart bar 820, 830.

A person placing the seat cushion 840 into the shopping cart seat needs to unfold the seat cushion 840, and slightly move the seat cushion to the left and to the right while pressing, to force the shopping cart bars 820, 830 to go through the openings 805, 815.

Figure 9:
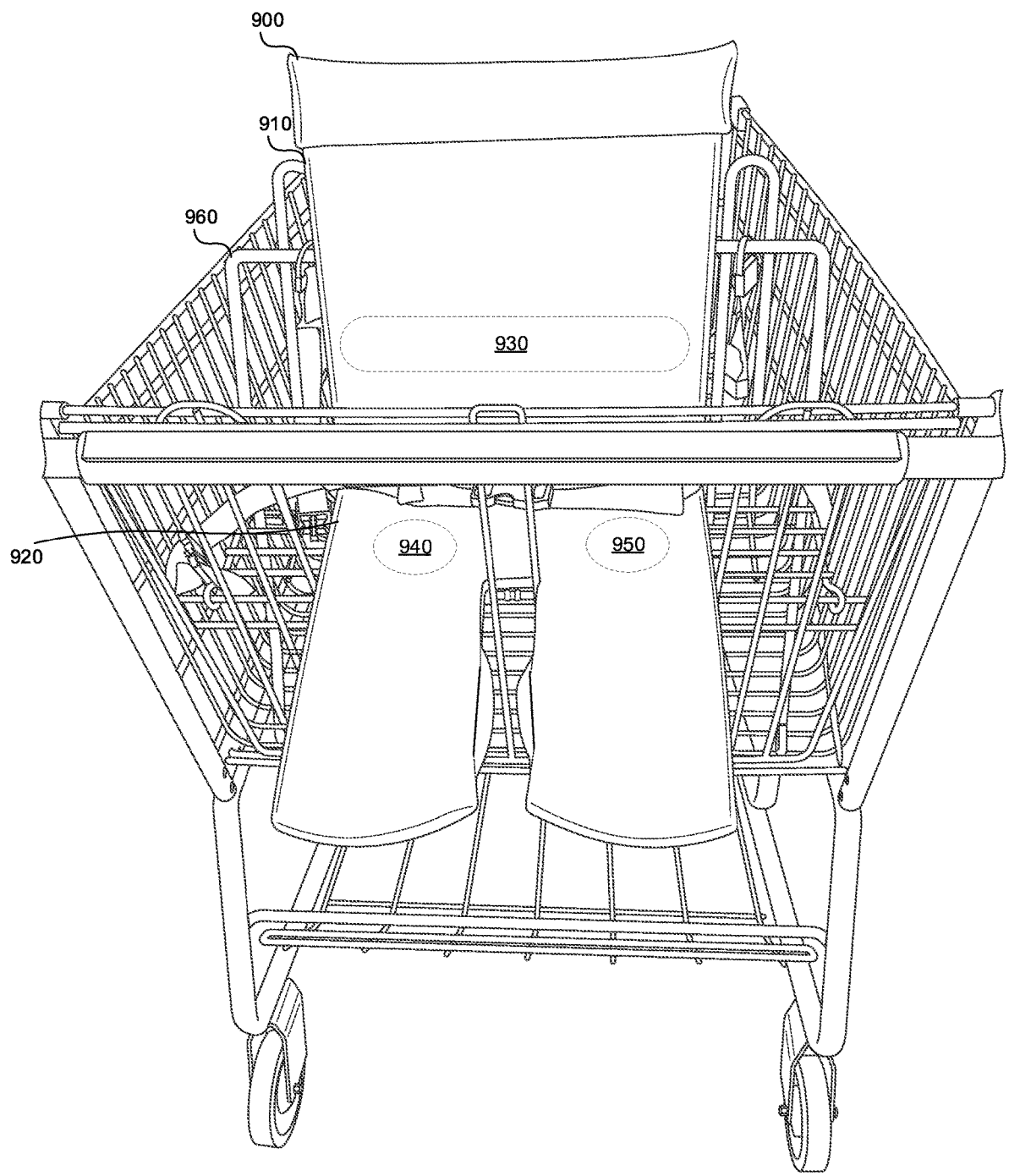
FIG. 9 shows an attachment mechanism, according to another embodiment.

FIG. 9 shows an attachment mechanism, according to another embodiment. The seat cushion 900 can include one or more magnets 930, 940, 950 in the backrest 910 of the seat cushion 900 and/or in the seat 920 of the seat cushion 900. The magnet 930, 940, 950 can take various shapes such as a rectangle, the ellipsoid, etc. The magnet 930, 940, 950 can detachably secure the seat cushion 900 to a ferromagnetic material contained in the shopping cart seat 960. In addition, the magnets 930, 940, 950 can have opposite polarity, and when the backrest 910 and the seat 920 are close to each other, the magnets 930, 940, 950 can attract, thus securing the backrest 910 to the seat 920. As a result, the seat cushion 900 takes on a compact shape and can be easily carried and stored, for example, in a diaper bag.

Figure 10:
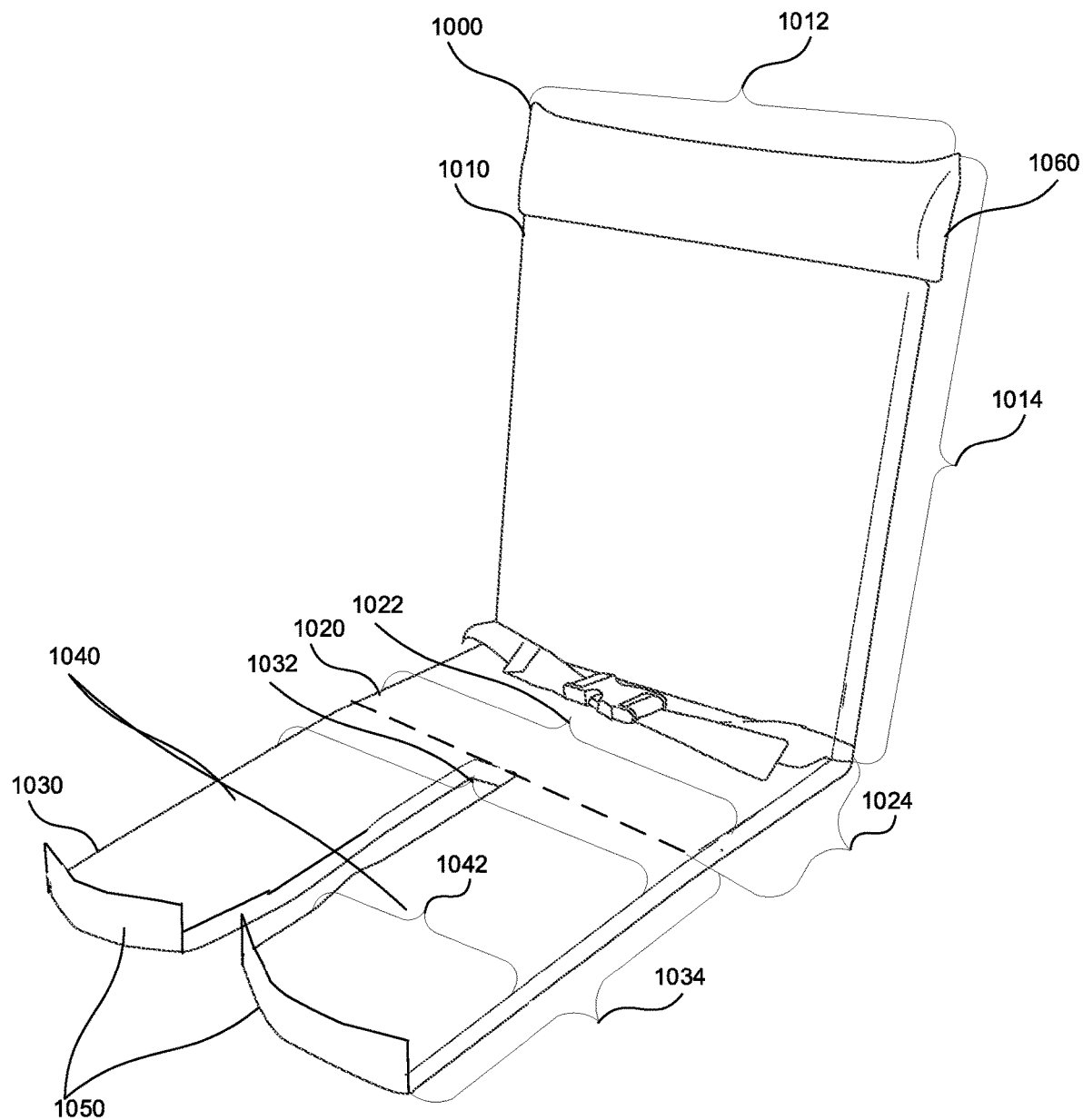
FIG. 10 shows various dimensions of the seat cushion.

FIG. 10 shows various dimensions of the seat cushion 1000. The backrest 1010 of the seat cushion 1000 can have a width 1012 between 10 inches and 14 inches inclusive, and a height 1014 between 9 inches and 14 inches inclusive. The back portion 1020 of the seat cushion 1000 can have a width 1022 between 10 inches and 14 inches inclusive, and a length 1024 between 4 inches and 6 inches inclusive. The front portion 1030 of the seat cushion 1000 can have a width 1032 between 10 inches and 14 inches inclusive, and a length 1034 between 4 inches and 9 inches inclusive. Each prong of the two prongs 1040 can have a width 1042 between 4 and 6 inches inclusive, and a length 1034 between 4 and 9 inches inclusive. In addition, the seat cushion 1000 can have an optional foot rest 1050 attached to each prong of the two prongs 1040.

The headrest 1060 can have an enlarged thickness comprising the cushioning layer and disposed on the backrest opposite the back portion of the seat. The headrest 1060 can extend between 0.5 and 2 inches above the backrest 1010. The headrest at its thickest can be up to 3 inches in thickness. The headrest 1060 can be detachable from the seat cushion 1000.

Figure 11A:
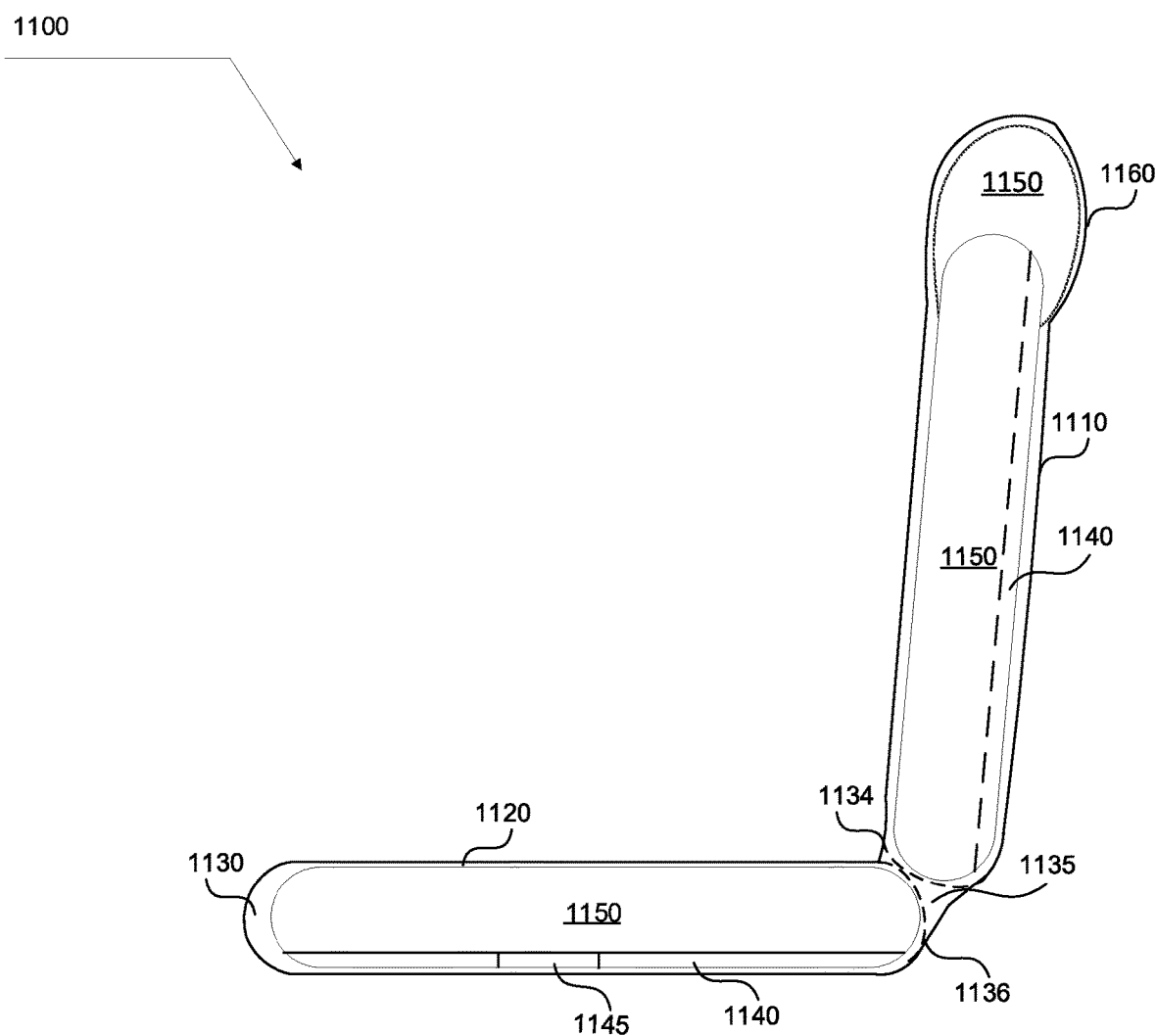
FIG. 11A shows various layers contained within the seat cushion, according to one embodiment.

FIG. 11A shows various layers contained within the seat cushion 1100, according to one embodiment. The seat cushion 1100 contains the backrest 1110, the seat 1120, and the headrest 1160, which can contain separate layers. The backrest 1110 and the seat 1120 can be jointly covered by a covering layer 1130. In some embodiments, the headrest 1160 can be included within the covering layer 1130. In other embodiments, the headrest 1160 can be detachable from the backrest 1110, and is not included within the covering layer 1130.

The covering layer 1130 can form a juncture 1135 between the seat 1120 and the backrest 1110. The juncture can be thinner than either the backrest 1110 or the seat 1120, thus enabling the backrest 1110 and the seat 1120 to fold and contact each other. The covering layer 1130 can contain stitching 1134, 1136 to separate and contain the backrest 1110 and the seat 1120, respectively. The covering layer 1130 can be water and stain resistant and can be made of vinyl coating.

In addition to the covering layer 1130, the backrest 1110 can include a cushioning layer 1150 at most half an inch in thickness disposed above the firm layer and shaped into the seating area having the two prongs. The backrest 1110 can optionally include a firm layer 1140.

In addition to the covering layer 1130, the seat 1120 can include a firm layer 1140 and a cushioning layer 1150. The firm layer can be at most quarter inch in thickness, and shaped into a seating area having the two prongs. The cushioning layer 1150 can be at most half an inch in thickness disposed above the firm layer and shaped into the seating area having the two prongs.

In addition to the covering layer 1130, the headrest 1160 can include a cushioning layer 1150 having at most 3 inches in thickness.

The cushioning layer 1150 can include at least one of a cushion high density foam, such as the foam found in yoga mats, ethyl vinyl acetate, or a gel cushion. The firm layer can include at least one of a polyethylene structural foam, polyurethane structural foam, an ethyl vinyl acetate, HDPE, etc. As described in this application, the firm layer 1140 can include an optional medial region 1145 having different thickness and/or different material.

Figure 11B:
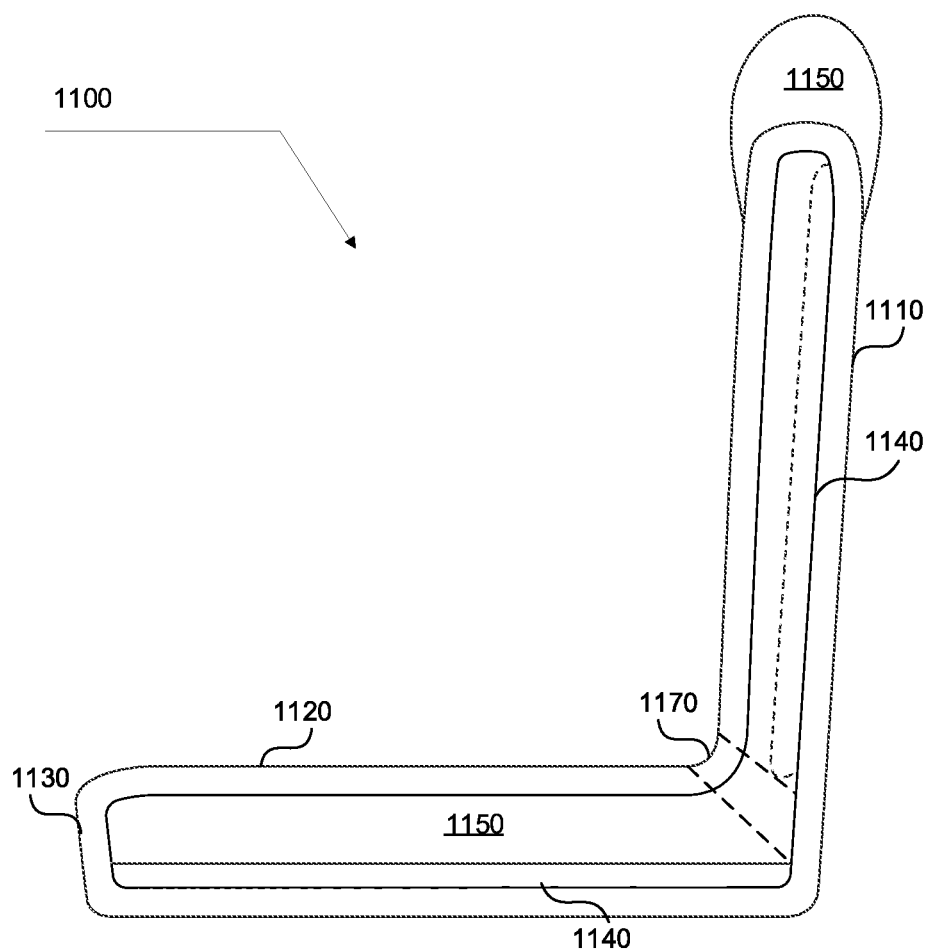
FIG. 11B shows various layers contained within the seat cushion, according to another embodiment.

FIG. 11B shows various layers contained within the seat cushion 1100, according to another embodiment. The seat cushion 1100 contains the backrest 1110, the seat 1120, and the headrest 1160, which can contain separate layers. The backrest 1110 and the seat 1120 can be jointly covered by a covering layer 1130. Unlike in FIG. 11A, the cushioning layer 1150 in FIG. 11B is continuous and forms both the backrest 1110 and the seat 1120. The firm layer 1140 can be a part of the seat 1120, and can optionally be part of the backrest 1110. The firm layer 1140 is not continuous, and the gap 1170 in the firm layer 1140, allows the seat cushion 1100 to fold on itself. Consequently, the backrest 1110, and 1120 can contact each other. The covering layer 1130 can continuously cover the backrest 1110 and the seat 1120. In some embodiments, the headrest 1160 can be included within the covering layer 1130. In other embodiments, the headrest 1160 can be detachable from the backrest 1110, and is not included within the covering layer 1130.

The covering layer 1130 can form a juncture 1135 between the seat 1120 and the backrest 1110. The juncture can be thinner than either the backrest 1110 or the seat 1120, thus enabling the backrest 1110 and the seat 1120 to fold and contact each other. The covering layer 1130 can contain stitching 1134, 1136 to contain the backrest 1110 and the seat 1120, respectively. The covering layer 1130 can be water and stain resistant and can be made of vinyl coating.

In addition to the covering layer 1130, the backrest 1110 can include a cushioning layer 1150 at most half an inch in thickness disposed above the firm layer and shaped into the seating area having the two prongs. The backrest 1110 can optionally include a firm layer 1140.

In addition to the covering layer 1130, the seat 1120 can include the firm layer 1140 at most quarter inch in thickness shaped into a seating area having the two prongs, and a cushioning layer 1150 at most half an inch in thickness disposed above the firm layer and shaped into the seating area having the two prongs.

In addition to the covering layer 1130, the headrest 1160 can include a cushioning layer 1150 having at most 3 inches in thickness.

The cushioning layer 1150 can include at least one of a cushion high density foam, such as the foam found in yoga mats, ethyl vinyl acetate, or a gel cushion. The firm layer can include at least one of a polyethylene structural foam, polyurethane structural foam, an ethyl vinyl acetate, HDPE, etc. As described in this application, the firm layer 1140 can include an optional medial region 1145 having different thickness and/or different material.

Figure 12A:
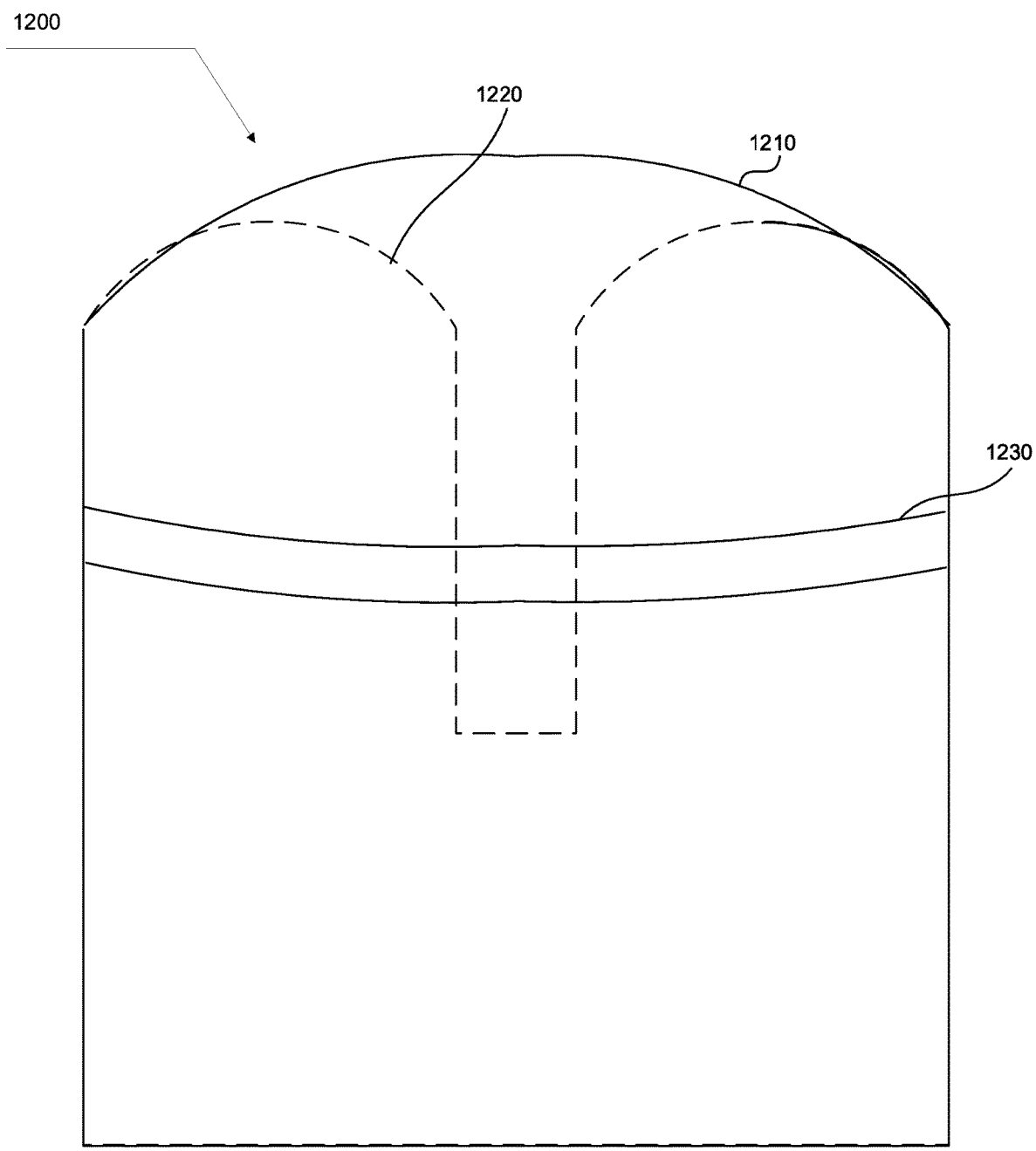
FIG. 12A shows a top view of the seat cushion folded.

FIG. 12A shows a top view of the seat cushion folded. The seat cushion 1200 can fold so that the backrest 1210 and the seat 1220 are in contact with each other. The seat 1220 and the backrest 1210 of the seat cushion 1200 can be held together using a strap, or a magnet, as described in this application. The backrest 1210 can have a pocket 1230 that can hold a book, a wallet, an electronic device, etc. while the seat cushion 1200 is being carried.

Figure 12B:
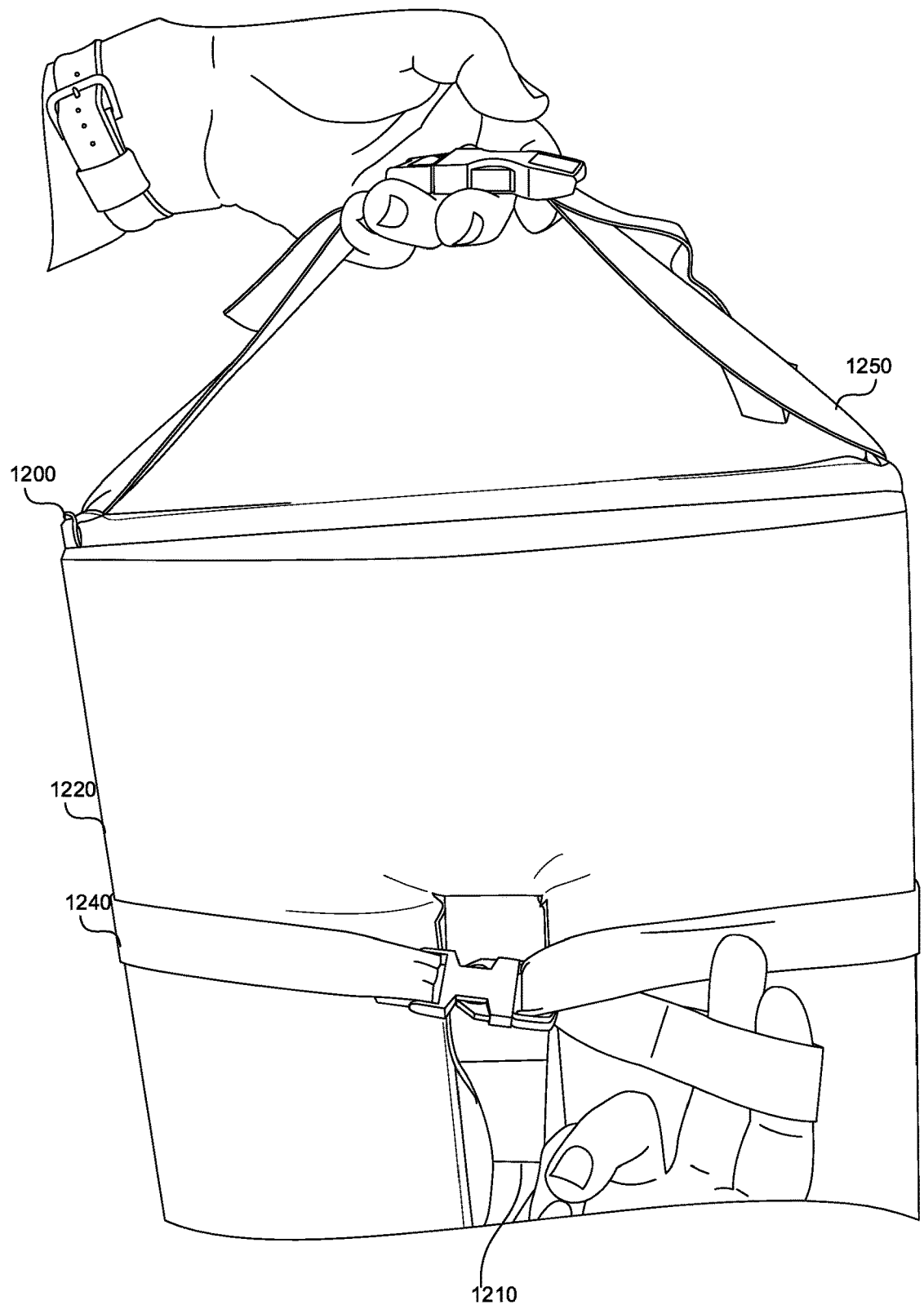
FIG. 12B shows the folded seat cushion being carried.

FIG. 12B shows the folded seat cushion being carried. The backrest 1210 and the seat 1220 can be held together using a strap 1240. The strap 1240 can be a shoulder strap, and can also be used to secure the seat cushion 1200 to the shopping cart. A strap 1250 can be used to carry the seat cushion 1200. Both straps 1240 and 1250 can have adjustable length. The strap 1250 can be buckled and strapped around a child's hips. When the strap 1250 is buckled in the opposite direction, the strap 1250 can be used to carry the seat cushion 1200, as shown in FIG. 12B.

Figure 13:
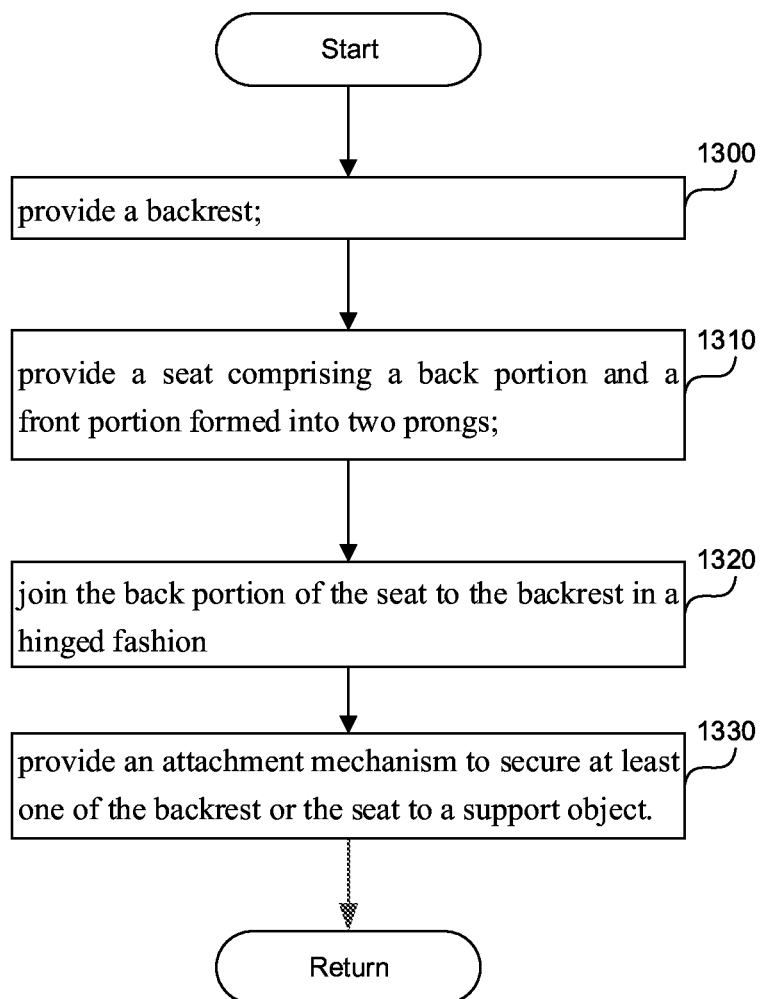
FIG. 13 is a flowchart of a method to manufacture a seat cushion.

FIG. 13 is a flowchart of a method to manufacture a seat cushion. In step 1300, a backrest can be provided. In step 1310, a seat including a back portion and a front portion formed into two prongs can be provided. In step 1320, the back portion of the seat can be joined to the backrest in a hinged fashion. For example, the back portion of the seat and the backrest can be sewn together as shown in FIG. 11. In step 1330, an attachment mechanism can be provided to secure at least one of the backrest or the seat to a support object, such as a shopping cart.

To create the backrest, and sometimes to create the seat portion, a firm layer at most quarter inch in thickness can be combined with a cushioning layer at most half an inch in thickness. The combination can be covered by a covering layer resistant to water and staining to obtain the seat. The firm layer, the cushioning layer and the covering layer can be made of various materials as described in this application.

The firm layer can be made of two materials, where a softer material forms a medial region corresponding to location of the child's knees. The first material can be injected into a mold comprising the back portion and the front portion formed into the two prongs having the medial region. The second material can be injected into the medial region of with the two prongs. The second material can be softer than the first material. The first material can be a polyethylene structural foam, polyurethane structural foam, an ethyl vinyl acetate, etc. The second material can be a softer material such as low-density polyethylene structural foam, low density polyurethane structural foam, low density ethyl vinyl acetate, cushion high density foam, ethyl vinyl acetate, or a gel cushion, etc. Finally, the mold can be removed to obtain the firm layer shaped as a seat having two prongs, where the firm layer is made of two different materials.

The attachment mechanism can be added to the seat cushion. A first protrusion configured to fit between two bars of a backrest of a shopping cart seat can be provided. The first protrusion can include two or more directional protrusions, which retract when the backrest is pushed against the backrest of the shopping cart seat. The directional protrusions can extend from the retracted position when the pressure on the directional protrusions reduces, such as when the directional protrusions are pushed past the bars of the backrest. Once the directional protrusions are pushed past the bars of the backrest they can lock to the bars and can resist separating the backrest of the seat cushion from the backrest of the shopping cart when in the locked position.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus comprising:
   a backrest to lean against a first support member;
   a seat comprising a back portion hingedly joined to the backrest and a front portion formed into two prongs, the seat to lean against a second support member; and
   an attachment mechanism to secure at least one of the backrest or the seat to the first support member or the second support member, respectively, wherein the attachment mechanism comprises a strap coupled to the backrest, the strap to detachably secure the apparatus to the first support member, and the strap to detachably secure the backrest to the seat when the backrest and the seat are folded with respect to each other, the strap having an adjustable length and configured to form a handle enabling carrying of the seat; and
   a headrest, detachably coupled to the backrest, having an enlarged thickness comprising a cushion and disposed on the backrest opposite the back portion of the seat.

2. The apparatus of claim 1, the attachment mechanism comprising a first protrusion configured to fit between bars of the backrest of a shopping cart seat, the first protrusion comprising a plurality of directional protrusions, a directional protrusion in the plurality of directional protrusions to retract when the backrest is pushed against the backrest of the shopping cart seat, to extend from the retracted position, to lock to the bars of the backrest of the shopping cart seat when in the extended position, and to resist separating the backrest from the backrest of the shopping cart seat when in the locked position.

3. The apparatus of claim 1, the attachment mechanism comprising:
the strap attached to the seat or the backrest to detachably secure a user to the apparatus.

4. The apparatus of claim 1, the attachment mechanism comprising:
a magnet to secure the apparatus to a ferromagnetic material within at least one of the first support member or the second support member.

5. The apparatus of claim 1, comprising a hooking member protruding from at least one of the backrest or the seat and defining an opening to accommodate a bar of the first support member or a bar of the second support member, the hooking member to attach to the bar of the first support member or the bar of the second support member.

6. The apparatus of claim 1, the seat comprising:
a firm layer at most quarter inch in thickness shaped into a seating area having the two prongs;
a cushioning layer at most half inch in thickness disposed above the firm layer and shaped into the seating area having the two prongs; and
a covering layer disposed above the cushioning layer and shaped into the seating area having the two prongs, wherein the covering layer is water and stain resistant.

7. The apparatus of claim 6, comprising:
the firm layer comprising at least one of a polyethylene structural foam, polyurethane structural foam, an ethyl vinyl acetate, or a high-density polyethylene (HDPE);
the cushioning layer comprising at least one of a cushion high density foam, the ethyl vinyl acetate, or a gel cushion; and
the covering layer comprising a vinyl coating.

8. The apparatus of claim 1, comprising:
the backrest having a backrest width between 10 inches and 14 inches inclusive, and a backrest height between 9 inches and 14 inches inclusive.

9. The apparatus of claim 1, comprising:
the front portion of the seat having a front-portion width between 10 inches and 14 inches inclusive, and a front-portion length between 4 inches and 7 inches inclusive.

10. The apparatus of claim 1, comprising:
each prong of the two prongs having a width between 4 and 6 inches inclusive, and a length between 4 and 7 inches inclusive.

11. The apparatus of claim 1, the two prongs of the front portion of the seat comprising a first material, each prong of the two prongs having a medial region having a second material, wherein the second material is softer than the first material, the second material to bend upon exertion of pressure.

12. A method to manufacture a seat cushion comprising:
providing a backrest;
providing a seat comprising a back portion and a front portion formed into two prongs by:
injecting a first material into a mold comprising the back portion and the front portion formed into the two prongs having a medial region;
injecting a second material into the medial region associated with the two prongs, wherein the second material is softer than the first material; and
removing the mold to obtain a firm layer;
joining the back portion of the seat to the backrest in a hinged fashion; and
providing an attachment mechanism to secure at least one of the backrest or the seat to a supporting object.

13. The method of claim 12, comprising:
combining the firm layer at most quarter inch in thickness, a cushioning layer at most half inch in thickness and a covering layer to obtain the seat.

14. The method of claim 12, said providing the attachment mechanism comprising:
providing a first protrusion configured to fit between two bars of the backrest of a shopping cart seat, the first protrusion comprising a plurality of directional protrusions, a directional protrusion in the plurality of directional protrusions to retract when the backrest is pushed against the backrest of the shopping cart seat, to extend from the retracted position, to lock to the two bars of the backrest of the shopping cart seat when in the extended position, and to resist separating the backrest from the backrest of the shopping cart seat when in the locked position.

15. The method of claim 12, said providing the attachment mechanism comprising:
providing a strap coupled to the backrest, the strap to detachably secure the seat cushion to the supporting object, and the strap to detachably secure the backrest to the seat when the backrest and the seat are folded with respect to each other.

* * * * *